United States Patent [19]
Hullihen et al.

[11] Patent Number: 5,119,579
[45] Date of Patent: Jun. 9, 1992

[54] ARCHERY FISHING APPARATUS

[76] Inventors: James W. Hullihen, 716 West Spring St.; James W. Hullihen, Jr., Rt. 1, Box 175C, both of Woodstock, Va. 22664

[21] Appl. No.: 701,743

[22] Filed: May 17, 1991

[51] Int. Cl.⁵ ............................................. A01K 91/02
[52] U.S. Cl. ...................................... 43/19; 43/6; 43/4; 273/418; 273/419
[58] Field of Search ............... 43/1, 4, 6, 19; 124/86, 124/88; 273/418, 419

[56] References Cited

U.S. PATENT DOCUMENTS

| | | | |
|---|---|---|---|
| 2,963,811 | 12/1960 | Nelson | 273/419 X |
| 3,150,875 | 9/1964 | Searles | 273/418 |
| 3,227,454 | 1/1966 | Ellenburg | 43/6 X |
| 3,949,730 | 4/1976 | Schoenberger | 43/19 X |
| 4,624,068 | 11/1986 | Howard | 43/6 |

*Primary Examiner*—Richard K. Seidel
*Assistant Examiner*—Patty E. Hong
*Attorney, Agent, or Firm*—Leon Gilden

[57] ABSTRACT

A fishing apparatus is provided wherein an archery bow mounting a fishing reel thereon includes a tether line of fishing string wound from the reel to an arrowhead member, wherein the arrowhead member is releasably mounted to a shaft for securement within a target fish for separation of the shaft to secure the fish permitting reeling in of the shaft, fish, and arrowhead assembly. A modification of the invention includes the arrowhead pivotally mounted to the shaft structure and a central shaft housing mounting an inflatable balloon member inflated to bring a target fish to the surface in a fishing situation for ease of sighting and retrieval of the fish.

1 Claim, 4 Drawing Sheets

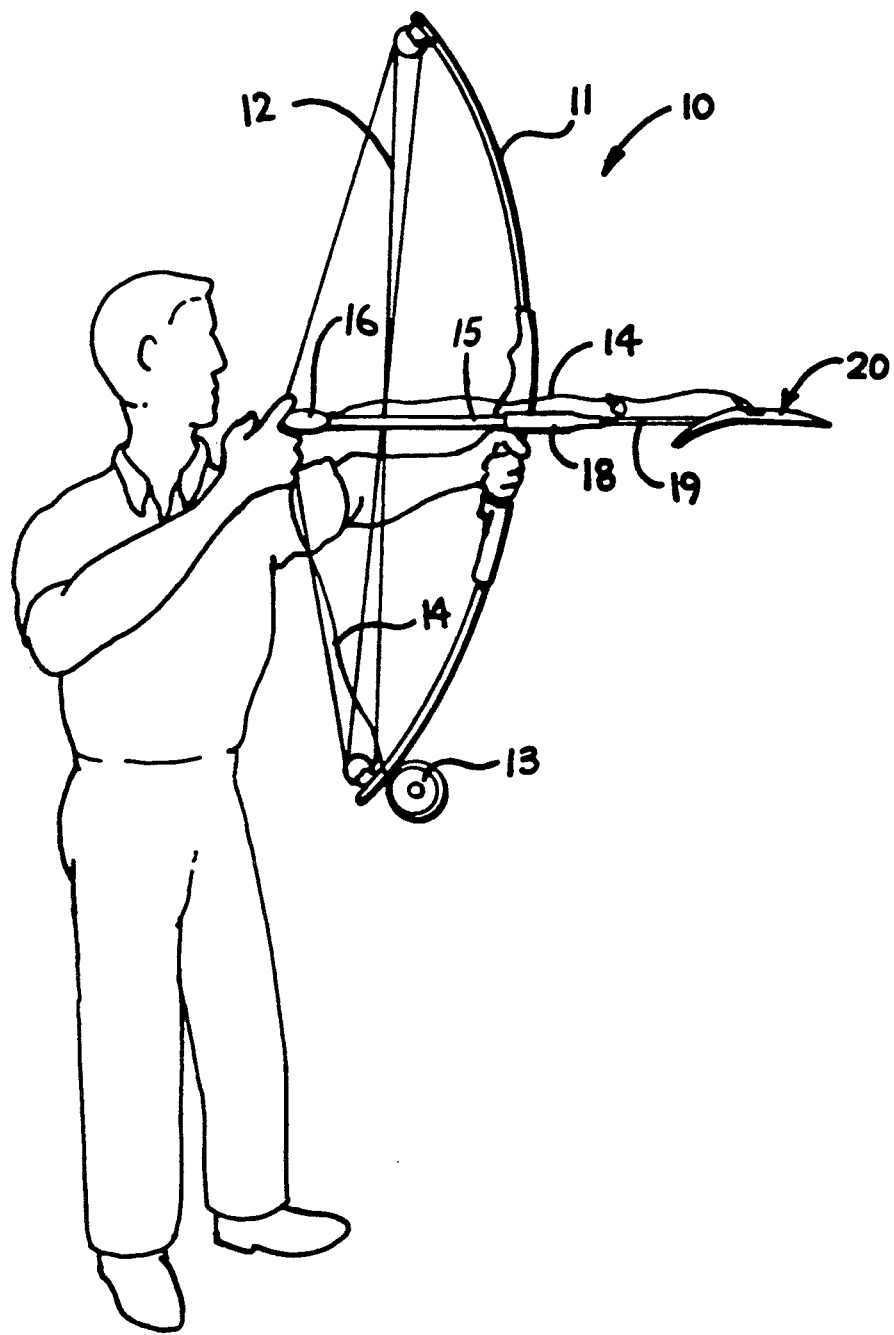

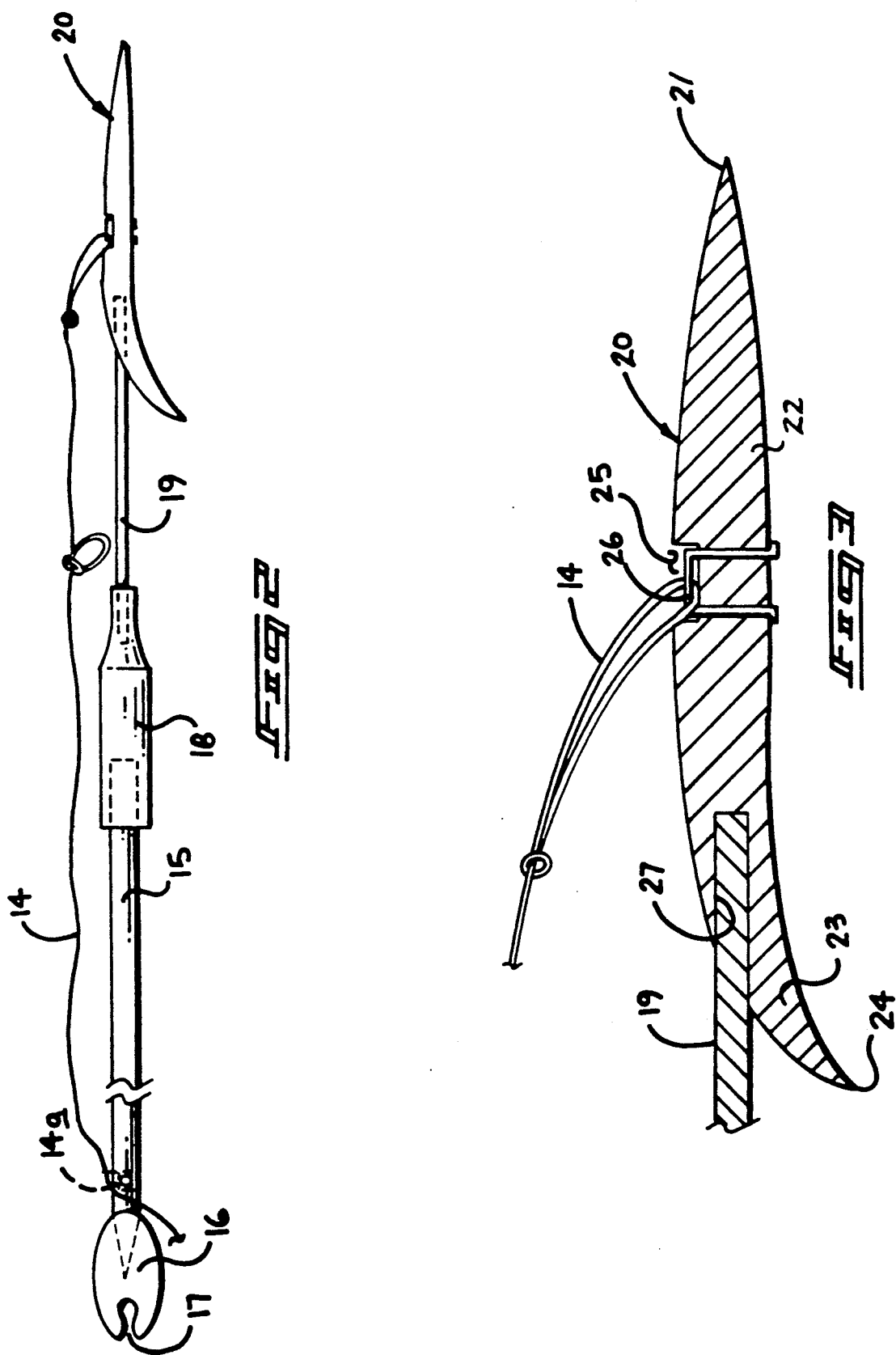

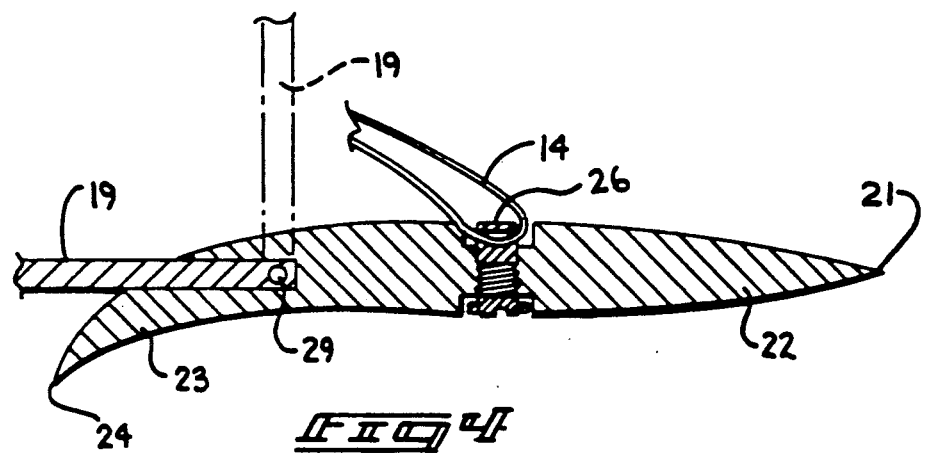
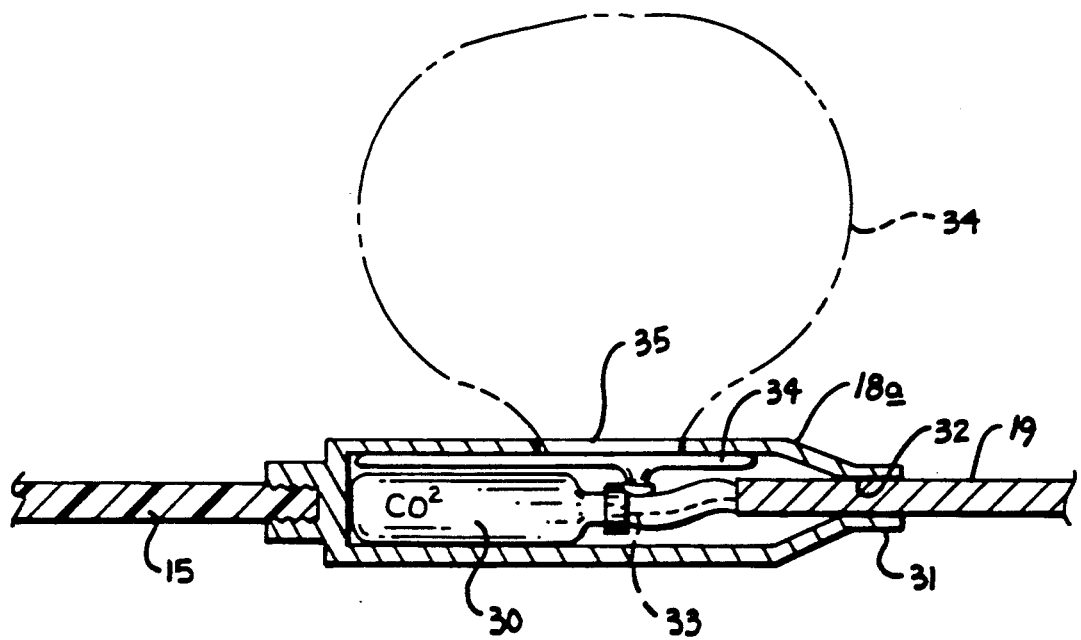

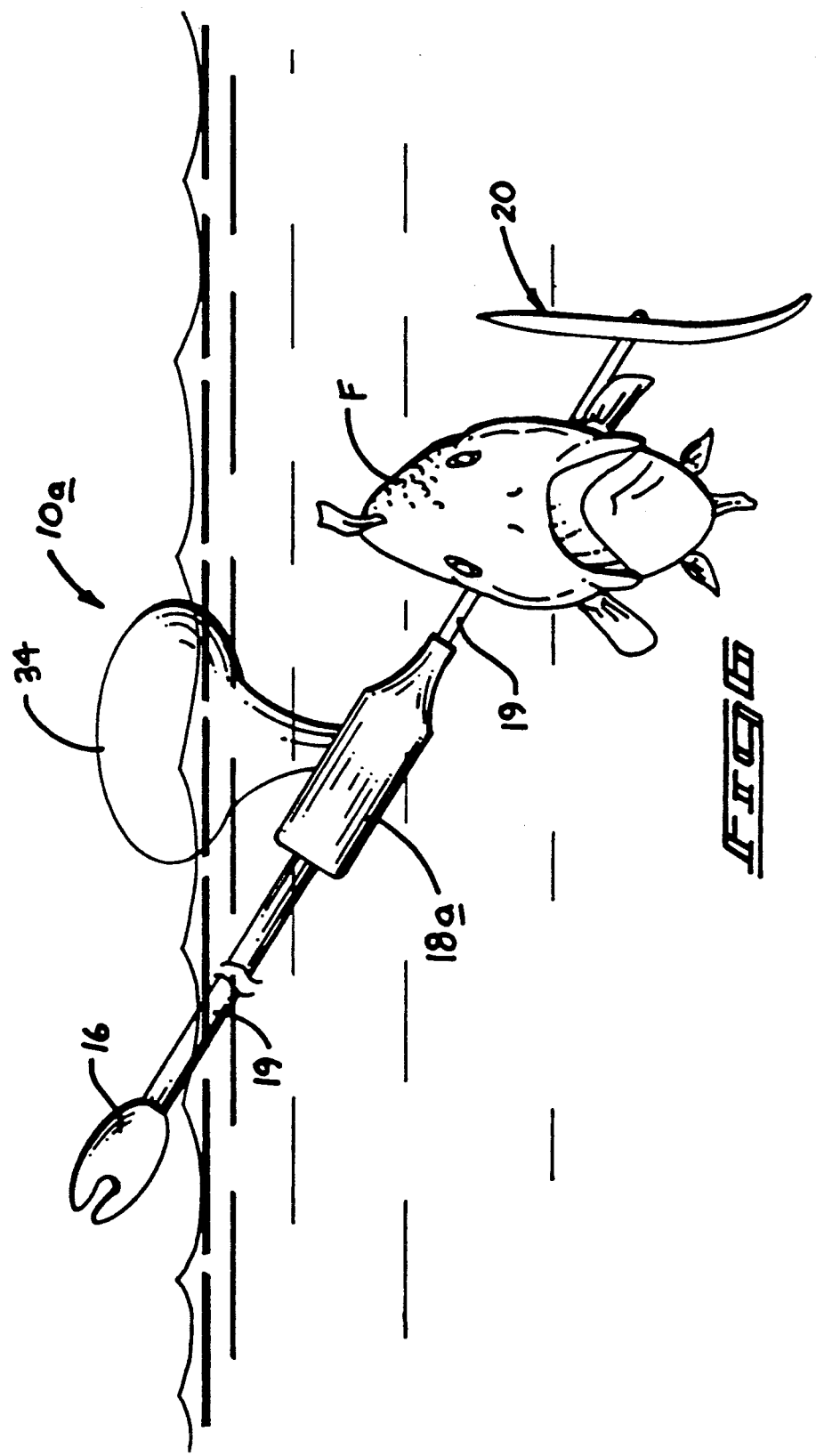

ARCHERY FISHING APPARATUS

BACKGROUND OF THE INVENTION

1. Field of the Invention

The field of invention relates to fishing apparatus, and more particularly pertains to a new and improved archery fishing apparatus wherein the same is arranged for striking a fish in an archery fishing procedure.

2. Description of the Prior Art

Various fishing apparatus is utilized in the prior art, both as a recreational sport and in use in various environments of hunting to include fishing. Examples of prior art archery apparatus in this category is exemplified in U.S. Pat. No. 4,095,397 to Juleg, Jr. wherein an arrow utilizes forward shaft, including rearwardly projecting spear member mounted to the arrowhead portion.

U.S. Pat. No. 3,036,395 to Nelson sets forth a fishing point releasably mounted, including pivotally positioned leg members for anchoring the point within a fish.

U.S. Pat. No. 3,945,642 to Henthorn, Jr. sets forth an arrowhead with the arrowhead including rearwardly projecting and diverging barbs directed rearwardly of the forward point of the arrow.

As such, it may be appreciated that there continues to be a need for a new and improved archery fishing apparatus as set forth by the instant invention which addresses both the problems of ease of use of as well as effectiveness in construction and in this respect, the present invention substantially fulfills this need.

SUMMARY OF THE INVENTION

In view of the foregoing disadvantages inherent in the known types of fishing apparatus now present in the prior art, the present invention provides an archery fishing apparatus wherein the same utilizes improved fishing points for entering a target fish. As such, the general purpose of the present invention, which will be described subsequently in greater detail, is to provide a new and improved archery fishing apparatus which has all the advantages of the prior art fishing apparatus and none of the disadvantages.

To attin this, the present invention provides a fishing apparatus provided with an archery bow mounting a fishing reel thereon and including a tether line of fishing string wound from the reel secured to a first arrow shaft and then secured to an arrowhead member, wherein the arrowhead member is releasably mounted to a shaft for securement within a target fish for separation of a second shaft to secure the fish permitting reeling in of the fish arrow shaft and arrowhead assembly. A modification of the invention includes the arrowhead pivotally mounted to the shaft structure and a central shaft housing mounting an inflatable balloon member inflated to bring a target fish to the surface in a fishing situation for ease of sighting and retrieval of the fish.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved archery fishing apparatus which has all the advantages of the prior art fishing apparatus and none of the disadvantages.

It is another object of the the present invention to provide a new and improved archery fishing apparatus which may be easily and efficiently manufactured and marketed.

It is a further object of the present invention to provided a new and improved archery fishing apparatus which is of a durable and reliable construction.

An even further object of the present invention is to provide a new and improved archery fishing apparatus which is susceptible of a low cost of manufacture with regard to both material and labor, and which accordingly is then susceptible of low prices of sale to the consuming public, thereby making such archery fishing apparatus economically available to the buying public.

Still yet another object of the present invention is to provide a new and improved archery fishing apparatus which provides in the apparatuses and methods of the prior art some of the advantages thereof, while simultaneously overcoming some of the disadvantages normally associated therewith.

Still another object of the present invention is to provide a new and improved archery fishing apparatus wherein the same utilizes an arrowhead member for anchoring within a fish during a fishing procedure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic side view of the instant invention.

FIG. 3 is an orthographic cross-sectional illustration of the arrowhead structure of the instant invention.

FIG. 4 is an orthographic side view of a modified arrowhead structure of the instant invention.

FIG. 5 is an orthographic side view of a modified arrow shank structure utilized by the instant invention.

FIG. 6 is an orthographic side view of a modified invention in a fishing situation.

DESCRIPTION OF THE PREFERRED EMBODIMENT

With reference now to the drawings, and in particular to FIGS. 1 to 6 thereof, a new and improved archery fishing apparatus embodying the principles and concepts of the present invention and generally designated by the reference numeral 10 will be described.

More specifically, the archery fishing apparatus 10 of the instant invention essentially comprises a bow member 11, including a bow string 12, the bow string 12 arranged for directing an arrow along a predetermined trajectory of flight. The bow member 11 includes a fishing reel 13 mounted adjacent a lower terminal end of the bow member, with a tether line 14 formed of typical fishing line wound about the reel 13. A forward terminal end of the tether line 14 is secured to an opening in a first a first arrow shaft 15, then secured to the arrowhead 20, as illustrated in FIG. 1 for example, by use of a square knot 14a or the like. A first arrow shaft 15 includes a nock 16 fixedly mounted at a rear terminal end of the first arrow shaft, with the nock 16 including a slot 17 directed through a rear terminal end of the nock 16 for receiving the bow string 12 therewithin. A central shaft housing 18 is fixedly mounted to a forward terminal end of the first arrow shaft 15, with a second arrow shaft 19 mounted to a forward end of the central arrow shaft 18, with the second arrow shaft 19 coaxially aligned with the first arrow shaft 15. The second arrow shaft 19 includes a forward terminal end slidably received within a central shank socket 27 of an arrowhead 20. The arrowhead 20 includes a forward point 21 coaxially aligned with the first and second arrow shafts, along with the central arrow shank 22 defined by the arrowhead 20. A further shank limb 23 projects laterally of the central arrow shank 22 and terminates in a limb point 24 positioned laterally of the secondary shaft 19 spaced from the forward terminal end of the second arrow shaft 19. A recess 25 is formed within the central arrow shank 22 mounting a recess clip 26 therewithin that secures the forward terminal end of the tether line 14. In use, the arrow shank 22 is released from the second arrow shaft 19 during use and imbedded within a fish, whereupon the reel 13 retrieves the fish, first arrow shaft 15 and the arrowhead 20.

FIGS. 4–6 illustrate a modified apparatus 10a (see FIG. 6) wherein the forward terminal end of the second arrow shaft 19 includes a pivot axle 29 to pivotally mount the second arrow shaft relative to the central arrow shank 22 adjacent a rear terminal end of the shank 22. A modified central shaft housing 18a includes a gas cylinder 30 coaxially aligned and contained therewithin, with a neck 31 slidably mounting the rear terminal end of the second arrow shaft 19, with a piercing shaft 33 arranged from the rear terminal end of the second arrow shaft 19 to the gas cylinder 30 to effect piercing of the shaft 32 to subsequently inflate a balloon 34 upon impact of the arrowhead 20 with a fish "F", as illustrated in FIG. 6. The balloon 34 is inflated and projects through a shaft housing opening 35 formed through a cylindrical side wall of the modified central shaft housing 18a to bring the organization to a surface portion of water along with the target fish "F".

In this manner, the first arrow head 15, as well as the arrow head 20, may be retrieved in a fishing procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An archery fishing apparatus comprising in combination,
    a bow member, the bow member including a bow string, and
    a reel mounted to the bow member, and
    a tether line wound about the reel, with the tether line including a forward terminal end remote from the reel, and
    an arrowhead, and a forward terminal end of the tether line mounted to the arrowhead, and
    a first arrow shaft, the first arrow shaft including a nock, with the nock including a slot receiving the bow string therewithin, and
    the first arrow shaft including a forward terminal end, and the first arrowhead forward terminal end mounted to a central shaft housing, and
    a second arrow shaft mounted to the second shaft housing spaced from the first arrow shaft, and
    a forward terminal end of the second arrow shaft mounted to the arrowhead, wherein the arrowhead includes a central arrow shank, with the central shaft, the second arrow shaft, the central shaft housing, and the first arrow shaft coaxially aligned relative to one another, and
    the central arrow shank including a further shank limb projecting rearwardly of the central arrow shank with a further shank limb including a limb point, and the central arrow shank including a forward point coaxially aligned with the central arrow shank, and
    the central arrow shank includes a central shank recess mounting a clip, and the clip secures the forward terminal end of the tether line thereof, and the central shaft housing includes a gas cylinder, the gas cylinder, including a neck, a the neck including a tubular opening slidably receiving a second arrow shaft rear terminal end therewithin, and the second arrow shaft rear terminal end including a piercing shaft, wherein the priercing shaft is arranged relative to the gas cylinder to effect piercing of the gas cylinder upon impact of the arrowhead with a target, and the gas cylinder is pneumatically mounted to a balloon, with the balloon secured within the central shaft housing in a first position, and the central shaft housing including a shaft housing opening directed through a side wall of the central shaft housing, wherein a balloon is directed through the shaft housing opening in a second position when the piercing shaft pierces the gas cylinder to inflate the balloon.

* * * * *